June 23, 1942.  D. B. DEWEY  2,287,297
MECHANICAL DRAFT COOLING TOWER
Filed Dec. 20, 1940   3 Sheets-Sheet 1

DAVID BRAINARD DEWEY
INVENTOR.

BY
ATTORNEY.

June 23, 1942.   D. B. DEWEY   2,287,297
MECHANICAL DRAFT COOLING TOWER
Filed Dec. 20, 1940   3 Sheets-Sheet 2
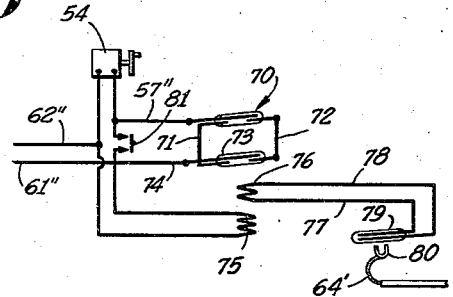
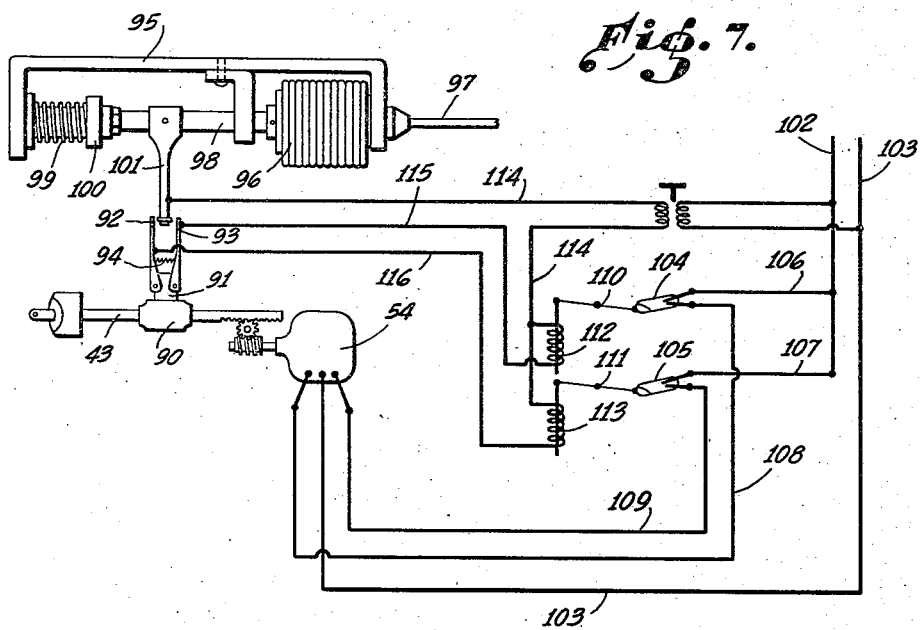
DAVID BRAINARD DEWEY
INVENTOR.
BY
ATTORNEY.

June 23, 1942.    D. B. DEWEY    2,287,297
MECHANICAL DRAFT COOLING TOWER
Filed Dec. 20, 1940    3 Sheets-Sheet 3
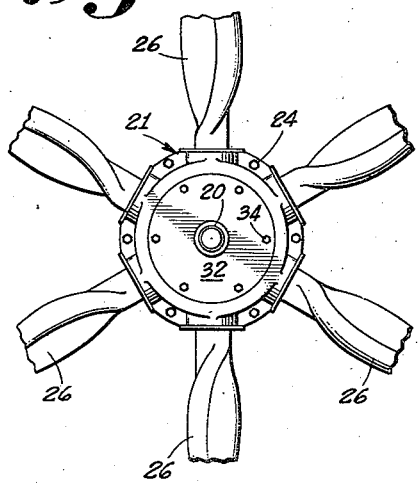
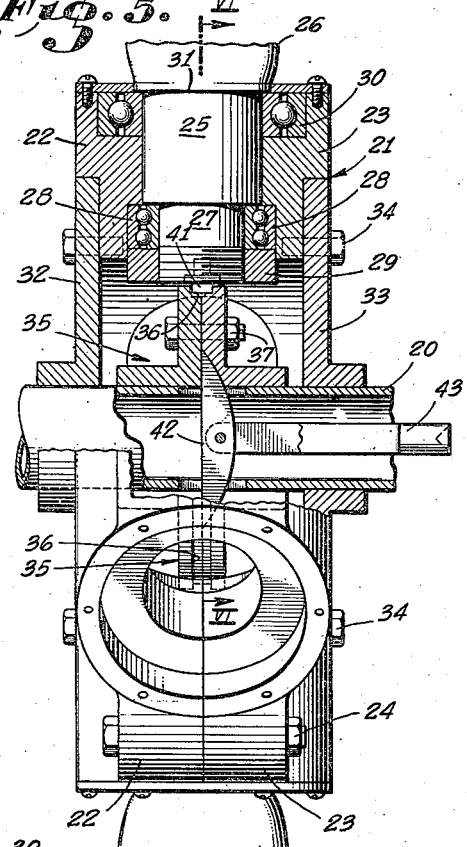
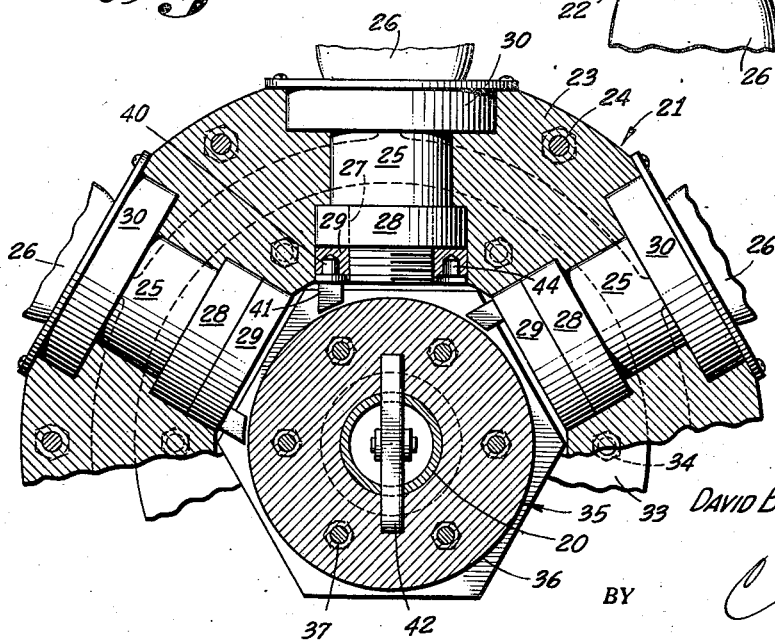
David Brainard Dewey
INVENTOR:
BY
ATTORNEY Patented June 23, 1942

2,287,297

UNITED STATES PATENT OFFICE 2,287,297

MECHANICAL DRAFT COOLING TOWER

David Brainard Dewey, Pasadena, Calif., assignor to The Fluor Corporation, Ltd., Los Angeles, Calif., a corporation of California Application December 20, 1940, Serial No. 371,020

13 Claims. (Cl. 261—109)

This invention pertains to improvements in cooling tower construction and operation and is particularly directed to mechanical draft cooling towers.

Mechanical draft cooling towers comprise walled enclosures provided with means for spraying water therethrough and a plurality of various baffles or grids over which the water may drip. Beneath the cooling tower is a collection basin in which the cooled water is collected. Mechanical draft cooling towers include blowers or fans for forcing air through the spray and around the baffles. These fans or blowers may either blow air into the cooling tower or suck air through the tower, thus giving rise to two types, namely forced draft and induced draft. Ordinarily, air is admitted near the bottom of the towers and discharged through the top.

Large volumes of air must be used in order to reduce the temperature of the water to a desired degree. The cooling effect of the air is influenced greatly by the humidity of the air as well as the temperature thereof. Since atmospheric conditions vary, it is difficult to produce cooling water at a uniform temperature. The cooling capacity of a tower will vary greatly with changes in atmospheric conditions. The cooling water may be used in condensers, heat exchangers and the like, and it is highly desirable, in order to obtain uniform conditions in an industrial operation employing cooling water in one of its steps, to maintain the cooling water at a substantially uniform temperature so as to eliminate undesirable variations and make certain that sufficient water of proper temperature is available for the normal industrial operations which are being carried out.

Attempts have been made to produce cooling water varying in temperature within only narrow limits by driving the blowers with variable speed motors. However, the motors employed in driving the blowers are generally of relatively high horse power and the cost of a variable speed motor of high horse power is several times that of a so-called constant speed motor. Moreover, variable speed motors are relatively inefficient and are therefore expensive to operate. For these reasons, variable speed motors are ordinarily not employed.

The present invention permits the use of constant speed motors and permits the blowers to be driven continuously and at a constant speed, thereby eliminating the difficulties encountered in starting and stopping heavy duty motors at short intervals as well as eliminating the use of variable speed motors and variable speed drives.

Generally stated, the present invention is directed to a method of operating mechanical draft cooling towers whereby the volume of air handled by a fan or blower is varied in accordance with the temperature of the water discharged by the cooling tower or resulting from the evaporation and cooling of the spray within the tower.

The invention is also directed towards means whereby accurate control of the temperature of the water as cooled by the cooling tower may be automatically maintained.

Briefly described, the means for accomplishing this result include a temperature responsive device in heat exchange relation to the cooled water in the collection basin or adjacent the outlet therefrom and auxiliary motor means, independent of the large heavy duty motors used in driving the blowers, for varying the volume of air moved by the blowers, the auxiliary motor being operatively controlled by the temperature responsive device. When the blower is in the form of a fan, the auxiliary motor means may change the pitch of the fan blades, thereby varying the volume of air moved by the blower even though the rotational speed of the fan is maintained constant.

It is an object of the present invention, therefore, to disclose and provide methods of operating mechanical draft cooling towers.

Another object is to provide methods of operating mechanical draft cooling towers whereby cooling water produced by the towers may be maintained within narrow temperature limits.

A further object is to provide methods of economically operating cooling towers whereby the final temperature of the water being cooled in the tower is maintained within relatively narrow limits, irrespective of changes in humidity or temperature conditions of the cooling air.

It is also an object of the present invention to provide means for automatically controlling the cooling effect of mechanical draft cooling towers whereby cooling water may be produced at a desired temperature with the minimum consumption of electrical energy or other power.

A still further object is to provide automatic and inexpensive means whereby the cooling capacity of towers may be automatically varied in accordance with changes in atmospheric conditions, to the end that the cooling effect of the towers is maintained substantially constant.

These and other objects, advantages, adaptations and modifications of the invention will become apparent to those skilled in the art from the following description of exemplary forms of the invention. For purpose of illustration, reference will be had to the appended drawings, in which:

Fig. 3 is a wiring diagram of a portion of a circuit for use in controlling the blowers in an accurate manner.

Fig. 4 is a side elevation of a blower hub.

Fig. 5 is a partial axial section of a form of blower shaft and hub adapted for adjustment in accordance with this invention.

Fig. 6 is a vertical section taken along the plane VI—VI in Fig. 5.

Fig. 7 is a partially diagrammatic representation of a modified form of control means.

Figure 1:
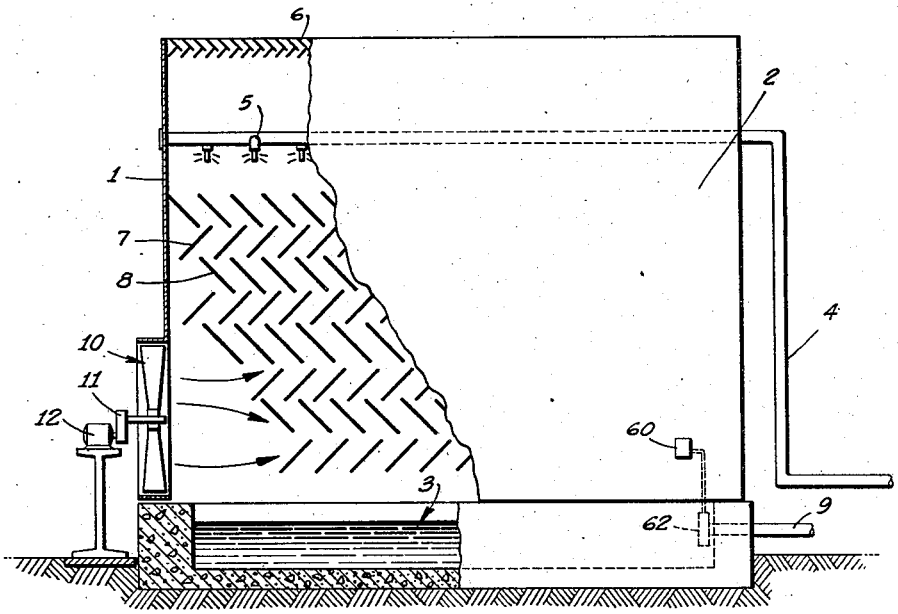
Fig. 1 is a side view, partly in section, of a cooling tower of the forced draft type.

As has been stated hereinbefore, the present invention is adapted for use in all mechanical draft cooling towers. Fig. 1 illustrates a tower of the forced draft type in which the air is positively blown into the cooling tower, the induced draft types (also embraced by this invention) differing from the type shown in the drawings only in that the blowers are used to suck air through the cooling tower.

As shown in Fig. 1, a single cooling tower may comprise an enclosure including the walls 1, 2, etc., mounted above a collection basin, generally indicated at 3. Near the upper end of the tower means are provided for introducing a spraying water. The inlet pipe is indicated at 4 and may be provided with a plurality of transverse headers 5 having spray means such as nozzles, perforated pipe sections, or the like, at suitably spaced intervals whereby a suitable distribution of spray over the entire horizontal cross-sectional area of the tower is attained. The top of the tower may be provided with what is termed a mist screen 6, comprising a series of baffles suitably arranged to prevent the upwardly discharging air from carrying with it some of the downwardly flowing spray.

Below the spray heads is a series of baffles, generally indicated at 7 and 8. These baffles may take a variety of forms. They are designed to expose a large surface to the action of the air blowing through the tower, thereby reducing the temperature of the water which drips from one set of baffles to another set. The present invention is not concerned with any specific arrangement of baffles.

Near the bottom of the tower and on one or more sides thereof there is positioned a fan or blower for supplying air to the tower. The size and number of blowers employed will vary with the size of the cooling tower. A single blower having the blades 10 is shown in Fig. 1, this blower being driven through a reduction gearing 11 by means of the motor 12. The blower 10 may be in the form of a multibladed fan. Blowers of this type have a diameter ranging from 8 to as high as 16 feet and the motors 12 ordinarily vary from about 10 to 40 horsepower. The baffles within the cooling tower are ordinarily so arranged with respect to the blower as to direct the air throughout the tower before permitting the air to move upwardly and discharge through the mist screen 6.

The water cooled within the tower drips from the lowermost baffles into the collection basin 3 and is often discharged through a line 9 to a point of use as, for example, a condenser, heat-exchanger, or the like. After performing this function, the water is often returned by means of the line 4 and again cooled.

In view of the size of the electric motor 12, it is customary practice to drive the blower 10 at a constant speed. Changes in atmospheric conditions and operating conditions, such as changes in temperature and humidity and in load, exert a very pronounced effect upon the cooling capacity of a cooling tower and for this reason the temperature of the water discharged by line 9 may vary within wide limits. Such variation is highly undesirable. The present invention permits substantially uniform cooling to be attained within the tower and permits the discharge of cooled water at a substantially constant temperature (or a temperature maintained within desired narrow limits) by varying the amount of air forced through the tower without changing the speed of the blower. This is accomplished by varying the displacement of the blower 10 by changing the pitch of the fan blades thereof.

Figs. 4, 5 and 6 illustrate one form of hub construction whereby the pitch of the blades may be readily varied.

The exemplary form illustrated in these figures shows a driving shaft 20 on which there is mounted for rotation therewith a hub generally indicated at 21, such hub being preferably of a split construction for the purpose of facilitating assembly. It may, for example, comprise two annular castings 22 and 23 adapted to be connected together by means of the bolts 24, thereby forming a plurality of radially extending bores adapted to receive the stub ends 25 of each of the blower blades 26. These stub ends 25 may have an inner end section 27 of smaller diameter and the bore in such zone may be slightly enlarged so as to receive a thrust bearing 28, retained in position by means of a collar 29 threadedly connected to the end portion 27 of each blower blade. A bearing 30 may also be carried by the annular hub ring made of portions 22 and 23, the bearing 30 being retained in position by means of a shoulder 31 on the blade stub.

The annular hub ring may be mounted upon the drive shaft 20 by means of members 32 and 33 connected to the hub ring by bolts 34. The members 32 and 33 are connected to the drive shaft 20 in any suitable manner.

Slidable upon the drive shaft 20 and within the space formed by the members 32 and 33 is a control member generally indicated at 35, said control member being provided along its outer edge portion with a groove 36. In the embodiment shown in the drawings, the control member 35 is of the split type, the two sections being held together by means of bolts 37. The outer edges of such control member may be hexagonal in form but the bottom of the groove 36 preferably forms a circle around the drive shaft 20.

The retaining collars 29, previously mentioned, carry crank pins pivotally retained within the collar as by the stub 40, the crank pins themselves being indicated at 41 and extending into the groove 36.

A key 42 extends through diametrically positioned slots in the walls of the drive shaft 20 and into the control member 35. An actuating rod 43 extends through the bore of the drive shaft 20 and is coupled to the key 42. Axial movement of the rod 43 will therefore cause longitudinal movement of the control member 35 along the drive shaft 20 and such movement will impart a simultaneous partial rotation to the blower blades 26 through the medium of the crank pins 41. It is not necessary that the actuating rod 43 be mechanically connected to the key 42, since the blower blades naturally tend to return to a position of no pitch (flat in the plane of rotation of the hub).

A diametrically opposed recess formed in the collar 29 and indicated at 44 may be used to receive the crank pin 41.

It is to be understood that the hub assembly, drive shaft 20 and actuating rod 43 rotate simultaneously, the control member 35 being capable of an axial movement in addition to its rotation.

Figure 2:
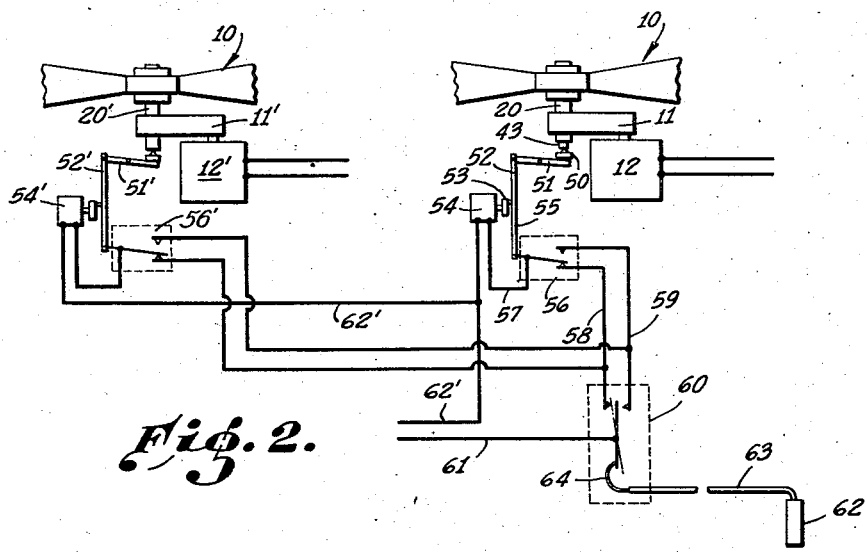
Fig. 2 is a diagrammatic representation of control means and of the electrical circuits employed, it being understood that this drawing is in simplified and diagrammatic form.

The drive shaft 20 is driven through suitable reduction gearing indicated at 11 (Figs. 1 and 2) by motor 12. Suitable bearings are provided for the drive shaft 20. The end of the actuating rod 43 is provided with a conical, axial depression adapted to receive the point of a freely rotatable member 50 carried by a lever 51 connected to a crank arm 52, said crank arm being actuated by an eccentric or crank 53 driven by a fractional horsepower motor 54, preferably provided with reduction gearing, not shown. As shown in Fig. 2, the crank arm 52 may be provided with an extension 55, operably connected to a snap-type, three-way switch 56, the common terminal of such switch being connected by line 57 with the motor 54. The other two terminals of this switch 56 are connected by lines 58 and 59 to a three-point control switch 60, whose movable terminal is connected to the power line 61, the other lead of such power line 62' running directly to the motor 54. The control switch 60 is actuated by a temperature responsive device such as, for example, an immersion tube 62 connected by tubing 63 with a Bourdon tube 64 which then actuates the movable terminal of the switch 60.

The position of the elements shown in Fig. 2 is that assumed by the parts when the temperature of the cooled water in the cooling tower is within a desired range. The immersion element 62 is ordinarily positioned near the outlet from the collection basin 3 of the cooling tower as shown in Fig. 1. The control switch 60 may be located at any desired point not too distant from the immersion tube. The break switch 56, the control motor 54 and its appurtenances may be closely adjacent to the blower and its main driving motor 12. If it be assumed that inward motion of the actuating rod 43 will increase the pitch of the blower blades so as to increase the volume of air being passed through the cooling tower, then the position of the lever 51 indicates that the blower is operating at a low pitch position. In the event, however, that the temperature of the cooled water in the collection zone 3 increases above a predetermined maximum, the movable terminal of the control switch 60 will contact the terminal to which lead 58 is connected. By such increase in temperature therefore, current will be supplied from line 61 through the control switch 60 to line 58 and then by lead 57 to the motor 54. Operation of this motor will actuate the connecting rod 52 so as to pivot the lever 51 and force the control rod 43 inwardly of the drive shaft 20. This same movement will cause the break switch 56 to break the circuit as soon as the motor 54 performs a half-revolution of the crank 53, thereby leaving the blower blades in full pitch position. The break switch 56 will now make contact between lines 57 and 59, and in the event the temperature of the cooled water drops below a predetermined minimum, the control switch will then connect line 61 and line 59 and permit the motor 54 to return the blower blades to their original position.

It is understood that the main drive motor 12 drives the fan at all times. It is to be further noted that under ordinary conditions the change in the pitch angle of the blower blades may vary from a minimum of about 0° to a maximum of about 30° to 45°. Stops may be provided to limit the movement of the blades in a number of manners and at different limits as will readily occur to those skilled in the art.

Large cooling tower installations often comprise a plurality of separate cells, similar to that illustrated in Fig. 1, each of the cells being provided with a separate fan or blower. As a result, the complete large installation may include a plurality of blowers. Each blower may be driven by a separate motor, but all of these blowers may be automatically controlled by a single thermo-responsive device. Fig. 2 illustrates how this may be accomplished.

It will be noted that the blower shaft 20' is driven through the reduction gearing 11' by motor 12' and is provided with a control mechanism including the lever 51', a connecting rod 52', suitable crank means and a control motor 54'. The control motor 54' is connected by line 62' to one side of the power line and by 57' to the break switch 56', which is connected to leads 58 and 59.

In the event a large cooling tower installation has a large number of blowers, the control system herein described may be caused to operate every other blower or any desired proportion of the total blowers instead of controlling all of the blowers simultaneously. Moreover, certain of the blowers may be caused to respond to smaller deviations or changes in temperature of water cooled than others and thereby reduce the number of changes in blower operation taking place during a given time interval.

When it is desired to maintain a more accurate control of the water temperature than that permitted by a control system such as is shown in Fig. 2, a separate control circuit may be employed, such control circuit then acting upon a power circuit. Mercury-type switches and relays of the type manufactured by "The Mercoid Corporation" are eminently suited for accurate control work and Fig. 3 diagrammatically illustrates an arrangement of this character. By referring to Fig. 3 a three-pole break switch of the mercury type is indicated at 70, the common leg being connected by 57" to the control motor 54, the other pole of the motor being connected to leg 62" of a power line whose other leg is 61". The break switch 70 is of the tipping type, and its tipping may be caused by a cam-operated link or lever (such as 52 and 55) driven by the motor 54. The break switch 70 is connected by leads 71 and 72 to a three-terminal relay switch 73 whose common leg is connected by lead 74 to leg 61" of the power circuit. The control circuit is provided with current from a transformer whose primary is indicated at 75, such primary being supplied from the power line 61"–62". The secondary of such transformer may be movable and associated with the relay switch 73 in such manner as to cause it to tip when the secondary coil is moved by magnetic repulsion. The secondary coil 76 is connected by lines 77 and 78 to a mercury-type, magnetically-operated switch 79. The magnet 80 is actuated by a thermo-sensitive device such as the element 64' connected to an immersion tube or the like. When the magnet 80 moves towards the switch 79 contact is made within the switch and magnetic repulsion set up in the secondary of the transformer 76 will cause the relay 73 to tip, thereby closing the circuit between lines 74 and 72.

In order to permit manual operation and thereby permit manual control of the volume of air being passed through a cooling tower, a button switch 81 may be inserted in the line so as to permit manual control of the motor 54 when desired.

In some instances, more sensitive response may be obtained by placing the thermo-responsive immersion device 62 in direct contact with the water cooled by the various baffles and grids 78 and the like just before such water becomes a part of the body of water within the collection zone 3. This can be accomplished by placing a gutter beneath the baffles and grids of the tower, but above the normal water level of the collection basin, so that the water cooled in the tower is first caught in a transverse gutter or gutters which discharge into the basin 3, the immersion tube 62 being placed within the gutters or adjacent the outlet of such gutters.

The control circuits illustrated in Figs. 2 and 3 contemplate positive changes in the pitch of the blades from a minimum pitch to a predetermined maximum position and vice versa. In some instances, it is highly desirable that the change in pitch be progressive in character. Fig. 7 illustrates an arrangement capable of being used in attaining such progressive changes. As there shown the fractional horsepower motor 54 is connected by suitable gearing to the actuating rod 43 in such manner as to translate rotation of the motor into longitudinal movement of the rod 43. The end of the rod 43 may be provided with a rack gear in engagement with a pinion, which pinion is then driven by worm gearing by the motor 54. The actuating rod 43 may carry, as shown, a holder 90 and an insulated block 91 having a pair of contact points 92 and 93 pivotally connected to the block 91, the contact points being held in desired spaced relation by a connecting spring 94.

In operative relation to the contact points 92 and 93 is a bracket 95 carrying an expandible bellows 96, one end of the bellows being attached to the bracket. This bellows is connected as by tube 97 to an immersion device such as the device 62. The other end of the bellows is movable and is connected to a rod 98. The bellows may be loaded as by means of a spring 99 bearing against part of the bracket 95 and against the rod 98. The loading may be varied by adjustably positioning the foot plate 100 on the rod 98.

Mounted on the rod 98 is a member 101 constituting a movable contact extending between the spaced contacts 92 and 93.

These devices are connected to a circuit which includes a power line having the leads 102 and 103 through mercury switches 104 and 105. It will be noted that line 103 is connected directly to the motor 54, whereas the line 102 is provided with branches 106 and 107 leading to the switches 104 and 105 respectively. The switch 104 is connected by line 108 to one field winding of the motor 54, whereas switch 105 is connected by line 109 to another field winding of the motor 54 adapted to cause the motor to reverse the direction of rotation.

The switches 104 and 105 are shown in open position and they are tipped into closed position by means of pivoted levers 110 and 111 respectively, actuated by solenoid coils 112 and 113 respectively. One end of each of these coils is connected as by line 114 to the movable contact 101. Coil 112 is connected as by line 115 to contact 93, whereas coil 113 is connected as by line 116 to contact 92.

It may be assumed that in the position shown in Fig. 7 the water being cooled by the tower is at the desired temperature. In the event the temperature of the water were to rise, the expansive character of the liquid or gas within the immersion tube 97 and bellows 96 would cause said bellows to expand and would move the contact 101 into contact with arm 92, thereby closing the circuit and energizing coil 113. The solenoid energized by such coil would actuate the pivoted lever 111, tip the switch 105 and close the circuit between lines 102, 107 and 109 leading to motor 54, causing said motor to move the actuating rod 43 in a direction adapted to increase the pitch of the fan blades and thereby increase the amount of air being passed through the mechanical draft cooling tower. The shaft 43 will therefore move to the left and such movement will cause the terminal 92 to move away from the arm 101 and break the contact. As soon as such contact is broken, switch 105 tips into open position and no further changes will take place until the thermo-responsive device again actuates rod 98 and arm 101.

Progressive changes in the pitch of the blades are thus accomplished and more accurate control of the temperature of the cooled water is attained. In the event the entire cooling tower is shut down for a weekend or holiday period, the pivoted character of the contact arms 92 and 93 will permit the thermo-responsive device to continue moving the arm 101 without breaking the points 92 and 93. During such shut-down all power to the circuit is cut off.

It is to be noted that the solenoids 112 and 113 are supplied with current from the main lines 102 and 103 through a transformer T.

It will be evident from the description given hereinabove that automatic means have been provided for the purpose of varying the volume of air moved by a blower or blowers through a cooling tower, variations in the volume of the air being accomplished in accordance with variations in the temperature of the water in the collection zone of the tower (or at any other desired point). The main power lines leading to the main driving motors are not interfered with in any manner and the heavy driving motors are permitted to operate continuously and at substantially uniform speed. Expenses and costs of operation attendant to the use of variable speed motors and their repeated starting and stopping are thereby eliminated. In accordance with the present invention it is possible to control the temperature of water cooled by a cooling tower to within a 2° range, irrespective of variations in humidity, air temperature or variations in the total amount of water being passed through the tower, and this can be done at great savings in power consumption.

In the exemplary forms described hereinabove the control motor 54 and its appurtenances have been shown mounted upon a standard or pedestal. In some instances it may be desirable to mount the control motor and mechanism connecting the same with the actuating rod directly on the hub of the fan for rotation therewith, suitable current being supplied to the control motor by the use of slip rings and brushes. In this modification, the entire fan assembly including its control motor could be slipped upon the existing shaft of an existing installation by simply removing the prior stationary blade and its hub. It is to be understood that in this modification the control motor, instead of operating a centrally positioned actuating or control rod, may transmit movement to a plurality of fingers extending through the hub and into contact with the crank pins which partially rotate the fan blade butts.

It is to be further understood that although the exemplary forms described and shown have illustrated electrical auxiliary motor means for varying the pitch of the blower blades, hydraulic or pneumatic motor means may be used, the thermo-responsive device then operating suitable valves to energize the fluid motor means. By counterbalancing individual fan blades so as to reduce the force tending to place them in no-pitch position, the bellows of the temperature responsive device may be considered as an auxiliary motor means and used to move the pitch-changing member of the blower directly. The term "motor means" as employed herein, includes therefore various types of motors.

All changes and modifications coming within the scope of the appended claims are embraced thereby.

I claim:

1. In a cooling tower including means for spraying water, a blower for forcing air through said spray and a collection basin for the cooled water, the combination of: motor means for driving said blower at substantially constant speed, a temperature-responsive device in heat exchange relation to the cooled water, and auxiliary motor means independent of said first motor means for varying the volume of air moved by said blower, said auxiliary motor means being operatively controlled by said temperature-responsive device.

2. In a cooling tower including means for spraying water, a blower for moving air through said spray and a collection basin for the cooled water, the combination of: variable pitch blades carried by said blower, a motor for driving said blower at substantially constant speed, a temperature-responsive device in heat exchange relation to the cooled water, an auxiliary motor means independent of said first motor means for varying the pitch of said blades and the volume of air moved by said blower, said auxiliary motor means being operatively controlled by said temperature-responsive device.

3. In a mechanical draft cooling tower including a collection zone for cooled water, the combination of: a blower provided with variable pitch blades, a motor for driving said blower at substantially constant speed; means for varying the pitch of said blades including an auxiliary motor independent of said first motor; a power circuit to said auxiliary motor, a break switch in said power circuit, means operated by said auxiliary motor for actuating said break switch, a three-pole switch in said power circuit and a low energy control circuit operably connected to a thermo temperature-responsive device, said low energy circuit being adapted to actuate said three-pole switch.

4. In a cooling tower including means for spraying water and a collection zone for cooled water, the combination of: a blower provided with a plurality of variable pitch blades, a motor for driving said blower, means for changing the pitch of said blades simultaneously including a movable member and an auxiliary motor operably connected to said movable member, an energizing circuit for said auxiliary motor and a temperature-responsive device in heat exchange relation to water cooled in said tower, said temperature-responsive device operatively controlling the energizing circuit to said auxiliary motor.

5. In a cooling tower including means for spraying water and a collection zone for cooled water, the combination of: a blower provided with a plurality of variable pitch blades, a motor for driving said blower, means for changing the pitch of said blades simultaneously including a movable member and an auxiliary motor for moving said movable member, a thermo-responsive device actuated by water cooled by said tower, a low energy control circuit adapted to be closed by said thermo-responsive device, a power circuit to the auxiliary motor and a switch in said power circuit adapted to be closed by said low energy circuit.

6. An apparatus for controlling the operation of cooling towers, comprising: a blower hub having a plurality of fan blade studs rotatably journaled therein, eccentric crank pins extending inwardly from said fan blade studs, an axially movable member within said hub adapted to movably engage said crank pins, an auxiliary motor operably connected to said axially movable member, a power circuit to said motor, said circuit including a break switch operable by said motor and a make switch in series therewith; and a device responsive to changes in temperature of water cooled by a mechanical draft tower for operating said make switch.

7. In a mechanical draft water cooling tower having walls forming a cooling chamber, means for passing water through said chamber, and a blower for causing air to flow through said chamber in intimate contact with the water therein; the combination comprising a motor for driving said blower, a temperature-responsive blower control operable to vary the air-moving capacity of the blower itself and therefore the rate of air flow through said chamber caused by said blower, independently of the speed of said motor, and means rendering said blower control responsive to the temperature of water cooled in said chamber.

8. In a mechanical draft water cooling tower having walls forming a cooling chamber, means for passing water through said chamber, and a blower for causing air to flow through said chamber in intimate contact with the water therein; the combination comprising a motor for driving said blower, means including a temperature-responsive control and operated in accordance with changes in the temperature of cooled water collected in a body at the base of said chamber, for varying the air-moving capacity of the blower itself and therefore the rate of air flow through said chamber caused by said blower, independently of the speed of said motor.

9. In a mechanical draft water cooling tower including walls forming a cooling chamber, and means for passing water through said chamber; the combination comprising a blower having variable pitch blades and operating to cause air to flow through said chamber in intimate contact with the water therein, a motor for driving said blower, and a temperature-responsive blower control operable to vary the pitch of said blades and therefore the rate of said air flow through the chamber, independently of the speed of said motor.

10. In a mechanical draft water cooling tower including walls forming a cooling chamber, and means for passing water through said chamber; the combination comprising a blower having variable pitch blades and operating to cause air to flow through said chamber in intimate contact with the water therein, a motor for driving said blower, temperature-responsive means in heat exchange relation with water cooled in said chamber, and means operated by said temperature-responsive means for varying the pitch of said blower blades and the rate of said air flow caused by the blower, independently of the speed of said motor.

11. In a mechanical draft water cooling tower including walls forming a cooling chamber, and means for passing water through said chamber into a body of water at the base of the tower; the combination comprising a blower having variable pitch blades and operating to cause air to flow through said chamber in intimate contact with the water therein, a motor for driving said blower, and temperature-responsive means operated in accordance with changes of water cooled in said chamber and at a location above said body of water, for varying the pitch of said blower blades and therefore the rate of said air flow independently of the speed of said motor.

12. In a mechanical draft water cooling tower having walls forming a plurality of individual cooling chambers, and means for passing water through said chambers; the combination comprising individual blowers having variable pitch blades and operating to cause air to flow through said chambers in intimate contact with the water therein, motors for driving said blowers, and temperature-responsive control means operable to vary simultaneously the pitch of said blower blades and the rates of said air flow through the chambers independently of the speeds of the motors.

13. In a mechanical draft water cooling tower having walls forming a plurality of individual cooling chambers, and means for passing water through said chambers; the combination comprising individual blowers having variable pitch blades and operating to cause air to flow through said chambers in intimate contact with the water therein, motors for driving said blowers, and temperature-responsive control means in heat exchange relation to water cooled in said tower and operating in accordance with changes in the water temperature to vary simultaneously the pitch of said blower blades and the rates of said air flow through the chambers independently of the speeds of the motors.

DAVID BRAINARD DEWEY.